United States Patent
Tanaka

(10) Patent No.: US 9,539,686 B2
(45) Date of Patent: Jan. 10, 2017

(54) MACHINING APPARATUS

(75) Inventor: Norio Tanaka, Isesaki (JP)

(73) Assignee: NIHON SHORYOKU KIKAI CO., LTD., Isesaki-shi, Gunma (JP)

( * ) Notice: Subject to any disclaimer, the term of this patent is extended or adjusted under 35 U.S.C. 154(b) by 88 days.

(21) Appl. No.: 14/406,873

(22) PCT Filed: Jun. 29, 2012

(86) PCT No.: PCT/JP2012/066678
§ 371 (c)(1),
(2), (4) Date: Dec. 10, 2014

(87) PCT Pub. No.: WO2014/002250
PCT Pub. Date: Jan. 3, 2014

(65) Prior Publication Data
US 2015/0190896 A1 Jul. 9, 2015

(51) Int. Cl.
*B23C 3/12* (2006.01)
*B23Q 7/04* (2006.01)
(Continued)

(52) U.S. Cl.
CPC .............. *B23Q 7/046* (2013.01); *B23C 3/12* (2013.01); *B23Q 3/08* (2013.01); *B23Q 7/04* (2013.01);
(Continued)

(58) Field of Classification Search
CPC ....... B23C 3/12; B23C 2220/20; B25J 11/006; Y10T 409/304256; Y10T 409/304144; Y10T 29/5182; Y10T 409/3042; B23Q 7/047; B29C 37/02; B26D 7/086
(Continued)

(56) References Cited

U.S. PATENT DOCUMENTS 3,935,950 A 2/1976 Burch
5,056,964 A * 10/1991 Naka ................ B23B 39/003
29/41
(Continued)

FOREIGN PATENT DOCUMENTS

CN 1246406 A 3/2000
DE 3510752 A1 10/1986
(Continued)

OTHER PUBLICATIONS

International Preliminary Report on Patentability of PCT/JP2012/066678, mailed Dec. 31, 2014, and its English translation.
(Continued)

*Primary Examiner* — Erica E Cadugan
(74) *Attorney, Agent, or Firm* — Muncy, Geissler, Olds & Lowe P.C.

(57) ABSTRACT

There is provided a machining apparatus in which movement of a machining point is a little, restriction on the machining operation of an articulated robot is a little and movement of a worker for the teaching operation is a little. The machining apparatus has an articulated robot which is controlled in attitude according to a teaching operation and has a catch instrument for catching a workpiece at an arm tip thereof, and a machining unit equipped at a fixed portion located within an arm reachable zone of the articulated robot, wherein the machining unit has a working tool having a profiling portion where a machining target portion of the workpiece caught by the catch instrument of the articulated robot is pressed according to the attitude control of the articular robot, and a floating mechanism that pushes the working tool in a press direction of the workpiece.

10 Claims, 16 Drawing Sheets

(51) Int. Cl.

| | |
|---|---|
| *B25J 15/06* | (2006.01) |
| *B25J 15/08* | (2006.01) |
| *B25J 11/00* | (2006.01) |
| *B23Q 39/02* | (2006.01) |
| *B23Q 3/08* | (2006.01) |
| *B25J 9/10* | (2006.01) |
| *B25J 15/00* | (2006.01) |
| *B26D 7/08* | (2006.01) |
| *B29C 37/02* | (2006.01) |
| *B29L 7/00* | (2006.01) |

(52) U.S. Cl.
CPC ............ *B23Q 7/047* (2013.01); *B23Q 39/021* (2013.01); *B23Q 39/024* (2013.01); *B25J 9/1015* (2013.01); *B25J 11/006* (2013.01); *B25J 15/00* (2013.01); *B23C 2220/20* (2013.01); *B23C 2220/40* (2013.01); *B26D 7/086* (2013.01); *B29C 37/02* (2013.01); *B29L 2007/001* (2013.01); *Y10S 901/31* (2013.01); *Y10S 901/40* (2013.01); *Y10T 29/5122* (2015.01); *Y10T 29/5124* (2015.01); *Y10T 29/5182* (2015.01); *Y10T 409/3056* (2015.01); *Y10T 409/30532* (2015.01); *Y10T 409/304144* (2015.01); *Y10T 409/304256* (2015.01); *Y10T 409/305264* (2015.01); *Y10T 409/307672* (2015.01); *Y10T 409/308568* (2015.01)

(58) Field of Classification Search
USPC .......................... 409/140, 138, 139; 29/33 A
See application file for complete search history.

(56) References Cited

U.S. PATENT DOCUMENTS

| | | | | |
|---|---|---|---|---|
| 6,048,142 A | * | 4/2000 | Hashimoto | ............... B23C 3/12 29/888.022 |
| 6,432,333 B1 | | 8/2002 | Emoto | |
| 6,439,961 B1 | * | 8/2002 | Hammond et al. | ............... 451/5 |
| 6,655,247 B1 | * | 12/2003 | Walker | ............... B23Q 1/0009 82/122 |
| 7,736,101 B2 | * | 6/2010 | Dubell | ............... B23C 3/12 409/140 |
| 2003/0182782 A1 | * | 10/2003 | Hessbruggen | ............... B23Q 1/012 29/27 C |
| 2006/0034968 A1 | | 2/2006 | Wennberg | |
| 2010/0043610 A1 | | 2/2010 | Tanaka | |
| 2011/0200406 A1 | * | 8/2011 | Lang | ............... B23Q 7/047 483/31 |
| 2014/0017352 A1 | * | 1/2014 | Tanaka | ............... B25J 9/0084 425/436 RM |

FOREIGN PATENT DOCUMENTS

| | | | |
|---|---|---|---|
| DE | 9204108 U1 | * | 7/1993 |
| EP | 474588 A1 | * | 3/1992 |
| EP | 1905537 A2 | * | 4/2008 |
| JP | 05-050310 A | * | 3/1993 |
| JP | 05-193739 A | | 8/1993 |
| JP | H06-344287 A | | 12/1994 |
| JP | 07-124811 A | | 5/1995 |
| JP | 07-205077 A | | 8/1995 |
| JP | 08-118126 A | * | 5/1996 |
| JP | 2002-028812 A | | 1/2002 |
| JP | 2002-239824 A | | 8/2002 |
| JP | 2007-181883 A | * | 7/2007 |
| JP | 4955823 B1 | | 3/2012 |
| WO | 2004/035286 A1 | | 4/2004 |
| WO | 2007/039978 A1 | | 4/2007 |

OTHER PUBLICATIONS

International Search Report of PCT/JP2012/066678, mailed Sep. 4, 2012 and its English translation.
Office Action of corresponding Chinese application No. 201280073997.2 mailed on May 6, 2015.
Extended European Search Report of corresponding European application No. EP12879685 mailed on Jun. 15, 2015.

* cited by examiner (A)

(B)

(A)

(B)

(B)

(A)

MACHINING APPARATUS

CROSS REFERENCE TO RELATED APPLICATIONS

This application is a national stage of International Application No. PCT/JP2012/066678, which was filed on Jun. 29, 2012, and which is herein incorporated by reference.

TECHNICAL FIELD

The present invention relates to a machining apparatus using an articulated (multi-joint) robot.

BACKGROUND ART

When a plastic workpiece is molded by blow molding or the like, plastic material protrudes from mating faces of molds (dies) being used, so that unnecessary protrusions (burr) occur on the surface of the workpiece.

There has been recently proposed a deburring apparatus in which a working tool for deburring is mounted at the tip of an arm of an articulated robot and the robot is controlled to be operated on the basis of position data, etc. based on teaching so that the burr on the surface of the workpiece fixed at a predetermined position is removed by the working tool (see Patent Document 1, for example).

PRIOR ART DOCUMENT

Patent Document

Patent Document 1: International Publication No. WO2007/039978

SUMMARY OF THE INVENTION

Problems to be Solved by the Invention

However, when the working tool is mounted to the articulated robot, a machining point moves, which causes a problem that machining scraps scatter every time the machining point moves. In addition, there is also a problem that a worker must frequently move under a teaching operation (teaching). When plural working tools are used, it is necessary to exchange working tools on the articulated robot. Furthermore, when a working tool is mounted to the articulated robot, there is a risk that a power line, a signal line or the like of the working tool may coil around a robot arm. Therefore, there is a problem that the machining operation of the articulated robot is restricted, it is necessary to keep maintenance of cables or it is necessary to use expensive flex-resistant cables.

Therefore, an object of the present invention is to solve the problems of the above described prior art, and has an object to provide a machining device in which movement of the machining point is a little, restriction on the machining operation of an articulated robot is a little and also the movement of a worker under teaching is a little.

Means of Solving the Problem

In order to attain the above object, according to the present invention, a machining apparatus is characterized by comprising: an articulated robot which is controlled in attitude according to a teaching operation and has a catch instrument for catching a workpiece at an arm tip thereof; and a machining unit equipped at a fixed portion located within an arm reachable zone of the articulated robot, wherein the machining unit has a working tool having a profiling portion where a machining target portion of the workpiece caught by the catch instrument of the articulated robot is pressed according to the attitude control of the articulated robot, and a floating mechanism that pushes the working tool in a press direction of the workpiece.

According to the present invention, the articulated robot catches the workpiece, and the machining unit is equipped at the fixed portion located within the arm reachable zone of the articulated robot. Therefore, a machining point does not move, and cutting chips fall at the same machining position, so that the cutting chips do not scatter.

Furthermore, since the machining point does not move, movement of a worker may be a little during a teaching operation (teaching).

Since the machining unit is located at the fixed position, there is no risk that a power cable, a signal cable or the like of the working tool coils around the robot arm, the machining operation of the articulated robot is not restricted, cable maintenance is unnecessary, or it is unnecessary to use an expensive flex-resistance cable, and an inexpensive cable can be used.

In this case, the catch instrument may have a position deviation preventing mechanism that prevents relative position deviation caused by cutting resistance between the catch instrument and the workpiece when the workpiece is processed.

The catch instrument may be a workpiece suction type instrument, and the position deviation preventing mechanism may be configured to have a concave portion or a convex portion that fits on the surface of the catch instrument and designed along the shape of the workpiece.

The catch instrument may be a workpiece pinching type instrument, and the position deviation preventing mechanism may be configured to contain a balance cylinder to drive jaws that pinch the workpiece.

In a case where the workpiece is fed and processed under the state that the articulated robot catches the workpiece, when rigidity is not kept for the catch state of the workpiece, the workpiece vibrates during the processing of the workpiece, and thus high processing precision cannot be maintained.

According to the present invention, the catch instrument holds the workpiece without relative position deviation of the workpiece. Therefore, rigidity is kept so that the workpiece does not vibrate during the processing, the vibration of the workpiece can be restrained during the processing of the workpiece, and high machining precision can be maintained.

The articulated robot may execute a series of operations to take out the workpiece directly or indirectly from molds (dies) of a plastic molding machine and press the workpiece against the working tool.

The machining unit may have a plurality of working tools that are integrally equipped and different in type, and the articulated robot may press the workpiece against one of the working tools to process the workpiece while evacuating the other working tool, and press the workpiece against the other working tool to process the workpiece while evacuating the one working tool after the former processing is completed, whereby plural kinds of processing is continuously executed on the workpiece taken out from the molds.

The working tool may be a rotationally driving type tool, and may be configured to have a profiling portion to meet a profiling face of the workpiece.

The working tool of the present invention is configured to be capable to perform profiling processing to deal with thermal shrinkage of the workpiece by the floating mechanism. Therefore, under such a situation that the outer shape of the workpiece shrinks thermally when the workpiece is directly or indirectly taken out from the molds of the plastic molding machine, the processing of the workpiece can be performed, and a series of works to process and finish the plastic workpiece taken out from the molding machine can be easily, accurately and continuously performed in short time.

The machining unit may have a plurality of working tools different in type, and one of the working tools may be evacuated while the other working tool processes the workpiece.

When plural working tools are used, it has been conventionally necessary to perform tool exchange on the articulated robot. However, according to the present invention, the plural working tools are equipped to the machining unit, and thus it is unnecessary to perform tool exchange on the articulated robot.

Effect of the Invention

According to the present invention, the articulated robot catches the workpiece, and the machining unit is equipped at the fixed portion located with the arm reachable zone of the articulated robot. Therefore, movement of the machining point is a little, and cutting chips fall at the same machining position. Therefore, the cutting chips do not scatter. Furthermore, since the movement of the machining point is a little, the worker may move slightly during a teaching operation (teaching). Furthermore, since the machining unit is equipped at the fixed position, there is no risk that a power cable, a signal cable or the like of the working tool coils around the robot arm, the machining operation of the articulated robot is not restricted, cable maintenance is unnecessary and an inexpensive cable may be used.

MODE FOR CARRYING OUT THE INVENTION

An embodiment according to the present invention will be described hereunder with reference to the accompanying drawings.

Figure 1:
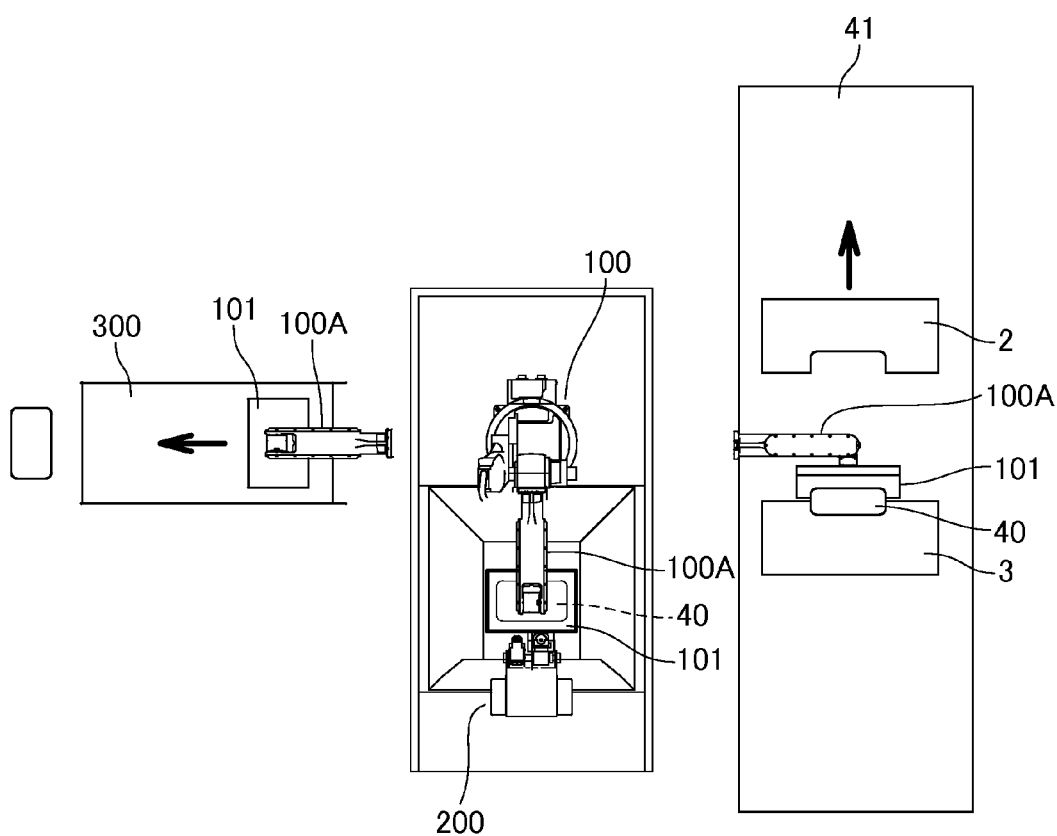
FIG. 1 is a plane view showing a machining apparatus according to an embodiment.

FIG. 1 shows a machining apparatus according to the embodiment.

The machining apparatus has an articulated (multi-joint) robot 100 and a machining unit 200, and is disposed to be adjacent to a plastic molding machine 41. In a working process, an article is called as a semifinished product before finish processing is completed, and also called as a completed product after finish processing is completed. In this specification, both the semifinished product and the competed product are referred to as "workpiece" for convenience of explanation.

The plastic molding machine 41 contains a movable mold 2 and a fixed mold 3 therein, and an article is molded by filling plastic under the state that the molds 2 and 3 are closed. After the molding, the movable mold 2 is opened in the direction of an arrow, and a workpiece 40 is taken out from between the molds 2 and 3.

In this embodiment, the workpiece 40 is taken out from between the movable mold 2 and the fixed mold 3 by using the articulated robot 100.

The articulated robot 100 is a 6-axial articulated (multi-joint) robot, and has a suction plate (catch instrument) 101 at the arm tip 100A thereof. The suction plate 101 is inserted in between the molds 2 and 3 to adsorb and catch the workpiece 40 by the suction plate 101, and the workpiece 40 is taken out by operating the articulated robot 100.

The articulated robot 100 catches the workpiece 40, and drives the robot arm to move a machining target portion 40T of the workpiece 40 to the machining unit 200 while controlling the attitude of the workpiece 40 caught at the arm tip 100A.

The surrounding area of the machining unit 200 serves as a machining space S. A machining dust (chips) receiving hopper 50 is placed below the machining space S, and a withdrawing tray 51 is placed below the machining dust receiving hopper 50. Reference numeral 300 represents a product exit chute, reference numeral 60 represents a safety fence, and reference numeral 61 represents alight curtain. For example, the light curtain 61 detects entrance of a worker into the safety fence 60, and the machining device is safely stopped when a worker is detected.

Figure 3:
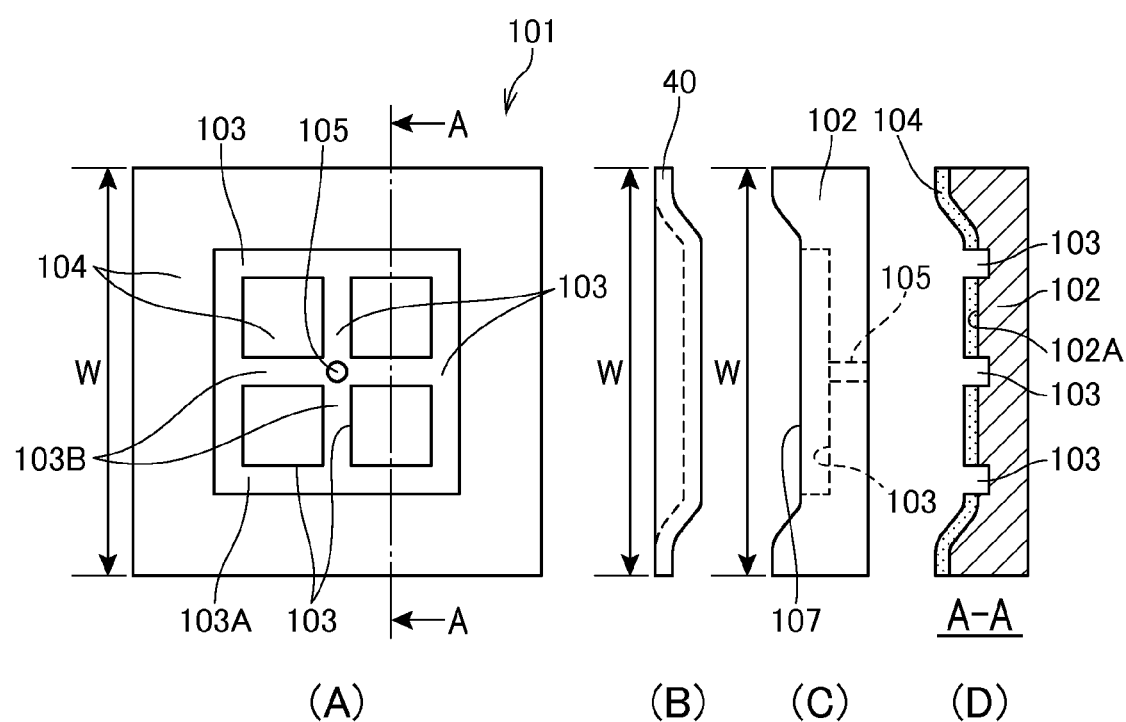
FIG. 3 A is a front view showing a catch instrument, B is a side view showing a workpiece, C represents a side view of the catch instrument and D is a cross-sectional view of the catch instrument.

FIG. 3 shows the suction plate 101.

The suction plate 101 is configured to be capable of catching the workpiece 40 with keeping rigidity so as to prevent relative position deviation or chatter vibration of the workpiece 40 due to cutting resistance caused by the machining unit 200 or the like under the processing of the workpiece 40 described later. In the following description, a machining target portion of the workpiece 40 is described as burr formed at the outer peripheral edge of the workpiece 40.

The suction plate 101 has a position deviation preventing mechanism for preventing relative position deviation caused by cutting resistance in processing the workpiece so that no relative position deviation occurs between the suction plate 101 and the workpiece 40 in processing the workpiece.

The suction plate 101 shown in FIG. 3 is a workpiece suction type tool, and it is configured as the position deviation preventing mechanism described above so as to contain a concave portion 107 which is placed on the surface of the suction plate 101 and designed along the shape of the workpiece 40.

Referring to FIG. 3B, the suction plate 101 is formed in such a size that the outer diameter W thereof is substantially matched with the outer diameter W of the workpiece 40 as shown in FIGS. 3A, C and D when the outer diameter W of the workpiece 40 is small in the range from 100 mm to 300 mm, for example.

As shown in FIGS. 3C and D, the surface 102A of the suction plate 101 is shaped like a saucer along the shape of the back surface of the workpiece 40 (concave portion 107) so as to receive the back surface of the workpiece 40, and plural groove portions 103 are formed on the surface 102A of the concave portion 107.

The groove portions 103 contain a rectangular peripheral groove portion 103A surrounding the concave portion 107, for example, a cross-shaped section groove portion 103B which intercommunicates with the peripheral groove portion 103A and sections the inside of the peripheral groove portion 103A at appropriate intervals, and a suction groove portion 105 which intercommunicates with the crossed portion of the section groove portion 103B, and a vacuum pump (not shown) is connected to the suction groove portion 105.

A cushion member 104 having excellent sealing capability is placed around the groove portions 103 on the surface of the catch tool. The arrangement of the grooves 103 is not limited to that shown in FIG. 3, and any mode may be applied insofar as it holds the machining target portion of the workpiece 40. For example, the peripheral groove portion 103A may be circular or polygonal, or the section groove portion 103B is not limited to the cross-shape.

In this construction, the rigidity of the suction plate 101 itself is enhanced.

Furthermore, the workpiece 40 is fitted to the concave portion 107 which is designed along the shape of the workpiece 40, and firmly sucked to the groove portions 103 of the concave portion 107, so that the relative position deviation of the workpiece 40 is prevented and the workpiece 40 comes into integrally close contact with the suction plate 101 with keeping rigidity. Accordingly, the machining target portion of the workpiece 40 can be firmly sucked, and the relative position deviation of the workpiece 40 and the chatter vibration in processing the workpiece 40 can be restrained, so that the machining precision can be kept high.

When the workpiece 40 is curved, the suction plate 101 may be configured so that the surface 102A of the plate main body 102 is curved as shown in FIG. 4A and the curved cushion member 104 is attached to the surface 102A by adhesive.

As shown in FIG. 4B, the surface 102A of the suction plate 101 may be shaped like a saucer along the shape of the back surface of the workpiece 40 (convex portion 109) so as to receive the back surface of the workpiece 40. In this case, the convex portion 109 constitutes the position deviation preventing mechanism described above.

Plural groove portions 103 are formed on the surface 102A of the convex portion 109. As not shown, the groove portions 103 contain a rectangular peripheral groove portion surrounding the convex portion 109, a cross-shaped section groove portion which intercommunicates with the peripheral groove portion and sections the inside of the peripheral groove portion at appropriate intervals, and a suction groove portion 105 which intercommunicates with the crossed portion of the section groove portion. A vacuum pump (not shown) is connected to the suction groove portion 105. Furthermore, a cushion member 104 having excellent sealing capability is placed around the groove portions 103 on the surface of the catch tool.

In this embodiment, the workpiece 40 is fitted to the convex portion 109 which is designed along the shape of the workpiece 40, and firmly sucked to the groove portions 103 of the convex portion 109, so that the position deviation of the workpiece 40 is prevented and the workpiece 40 comes into integrally close contact with the suction plate 101 with keeping rigidity. Accordingly, the machining target portion of the workpiece 40 can be firmly sucked, and the chatter vibration, etc. of the workpiece 40 in processing the workpiece 40 can be restrained, and the machining precision can be kept high.

When the outer diameter of the workpiece 40 is large, for example, equal to about 300 mm or more, the suction plate is configured to have a frame 107 and suction plates 101 each of which is secured to each of four corners of the frame 107 as shown in FIG. 5A. In the following description, the machining target portion of the workpiece 40 is described as burr formed on the outer peripheral edge portion of the workpiece 40.

In FIG. 5A, a broken-line portion represents the workpiece 40. The suction plates 101 on the upper side are configured so that the upper-side portions 101A thereof (see FIG. 5B) and the side portions 101B thereof are high, the suction plates 101 on the lower side are configured so that the lower-side portions 101C thereof (see FIG. 5C) and the side portions 101D are high, and the upper-side portion, the lower-side portion and the side portions are placed so as to surround the workpiece 40 on all four sides thereof so that the shape of the suction plate 40 is set to allow reception of the workpiece 40.

The suction plate can firmly suck the proximity of the machining target portion, and effectively restrain chatter vibration which is caused by the cutting resistance and occurs in the machining target portion. The suction plate 101 is required to be enhanced in rigidity and reduced in weight, and the whole weight can be reduced by providing plural compact suction plates 101.

Figure 4:
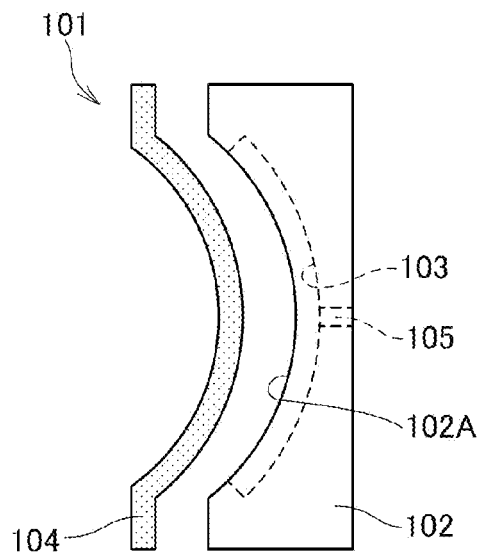
FIG. 4 A is a side view showing another example of the catch instrument, and B is a side view of another example of the catch instrument.
Figure 4:
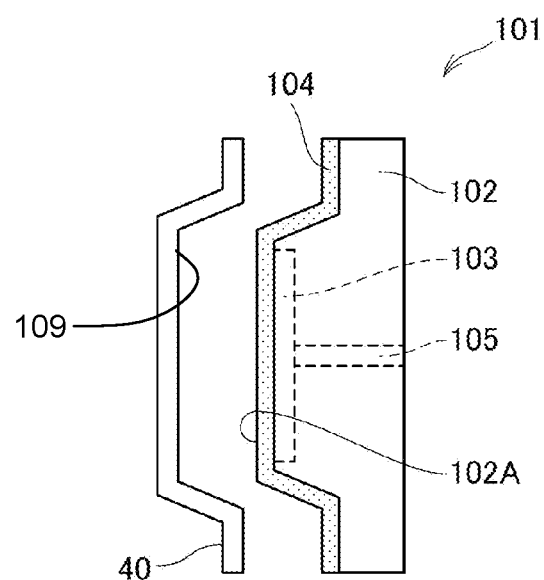
Figure 5:
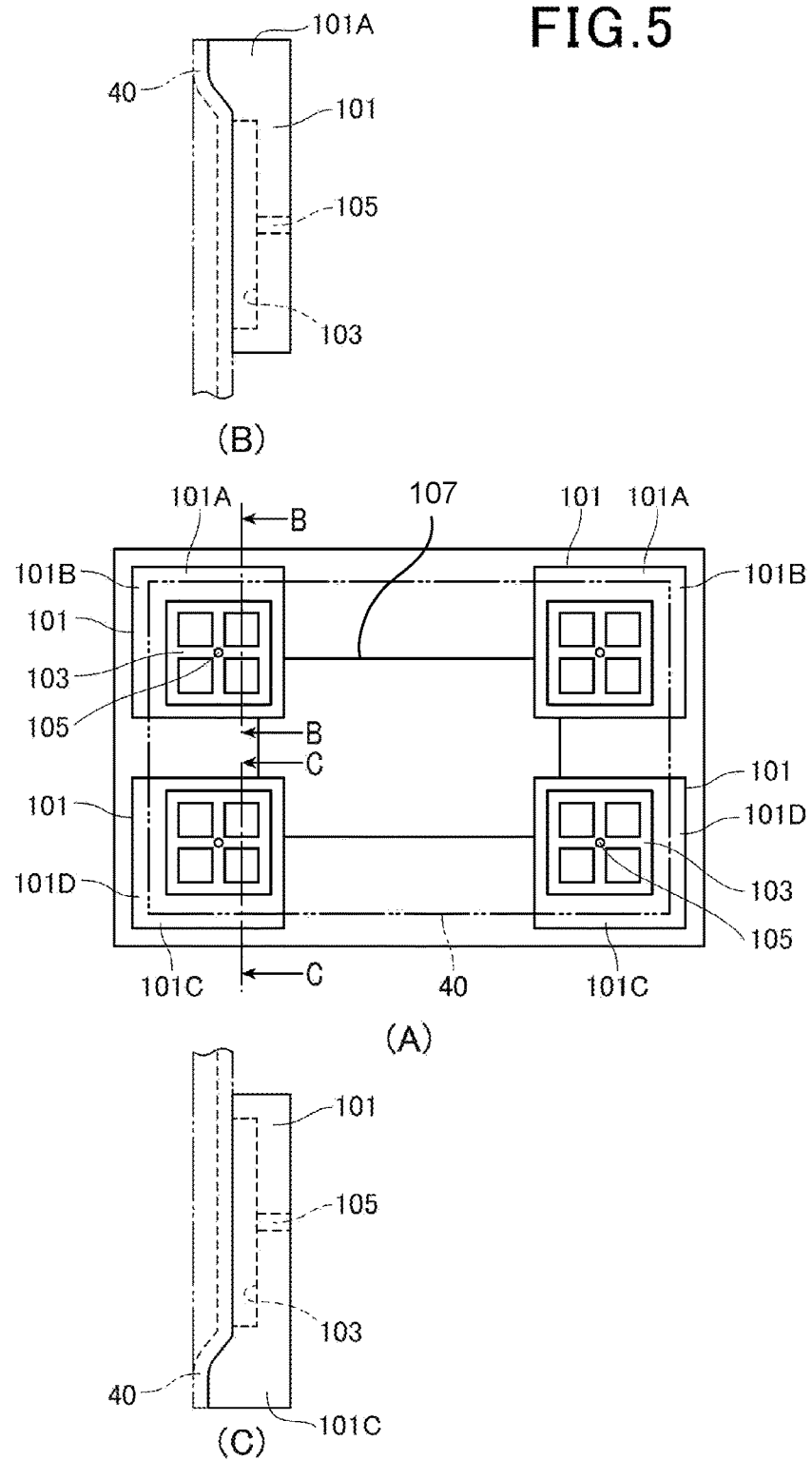
FIG. 5 A is a front view of the catch instrument, B is a side view showing one side of the catch instrument, and C is a side view showing the other side of the catch instrument.

In FIGS. 3 to 5, the outer peripheral edge portion of the workpiece 40 is a target to be machined. However, when a machining target (burr or the like) exists, for example, at the center portion of the workpiece 40, the machining device may be configured so that the workpiece 40 is sucked and held not at the four corners, but at the center portion of the workpiece 40.

Figure 16:
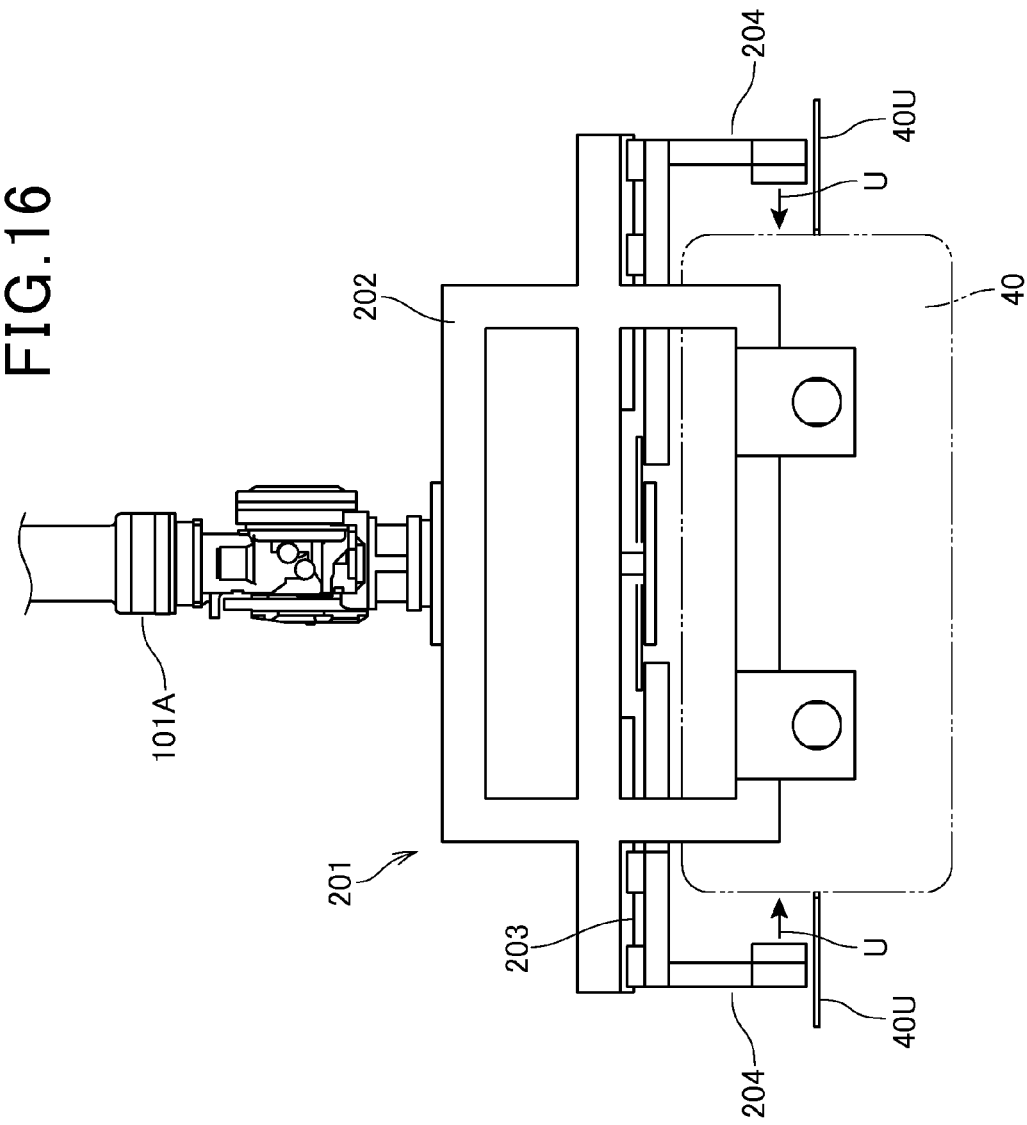
FIG. 16 is a diagram showing another embodiment of the catch instrument.

FIG. 16 shows another embodiment of the catch tool.

The catch tool 201 is a workpiece pinching type tool, and is suitable to catch a relatively large workpiece 40. The catch tool 201 has a hand frame 202 fixed to a robot tip 101A.

A balance cylinder 203 is placed on the hand frame 202, and a pair of jaws 204 for pinching the workpiece 40 is secured to the balance cylinder 203. The pair of jaws 204 are moved in the direction of an arrow U to pinch both the ends of the workpiece 40 by the operation of the balance cylinder 203. 40U represents the burr to be removed by the machining unit 200. The balance cylinder 203 operates to perform centering of the workpiece 40 at all times even when cutting resistance acts in multiple directions in the processing of the workpiece 40, thereby preventing relative position deviation between the hand frame 202 and the workpiece 40. The balance cylinder 203 constitutes the position deviation preventing mechanism.

Figure 6:
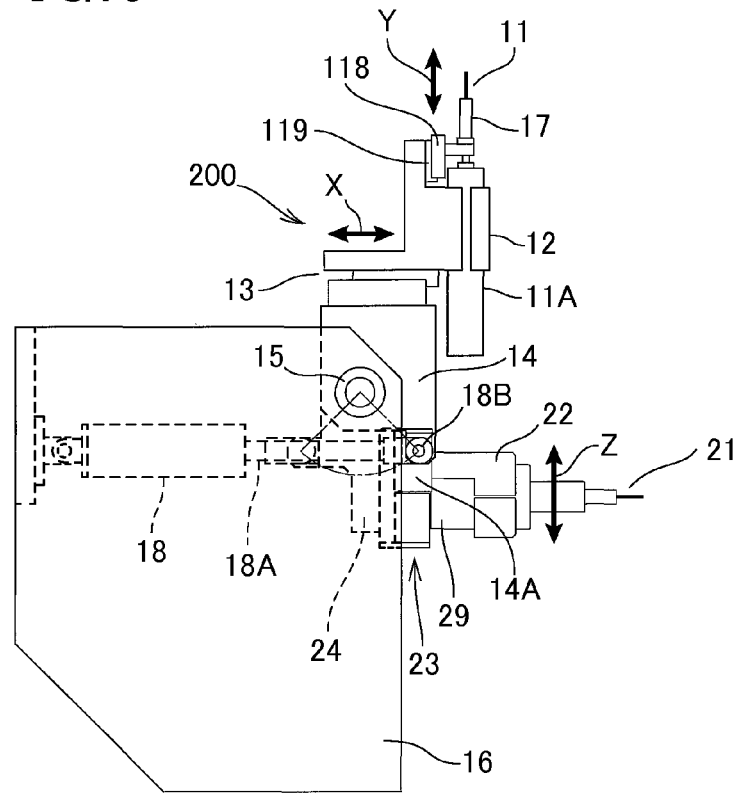
FIG. 6 A is a side view of a machining unit, and B is a top view of the machining unit.
Figure 6:
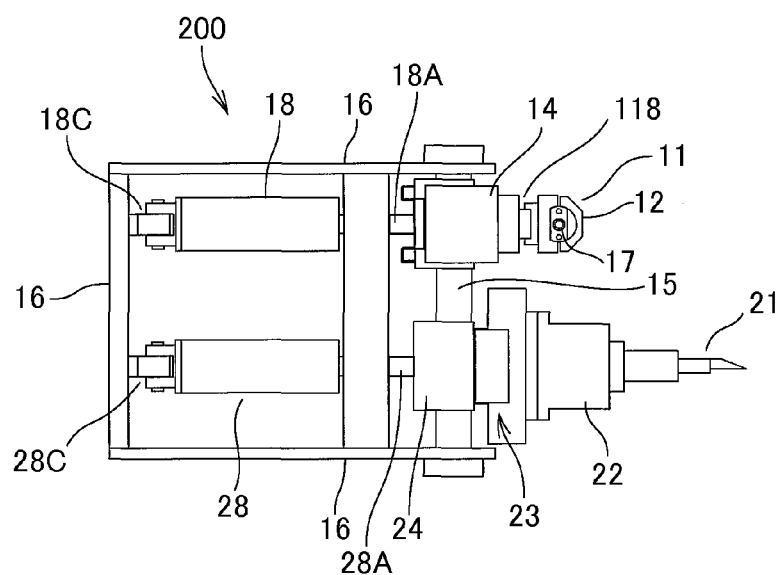
Figure 7:
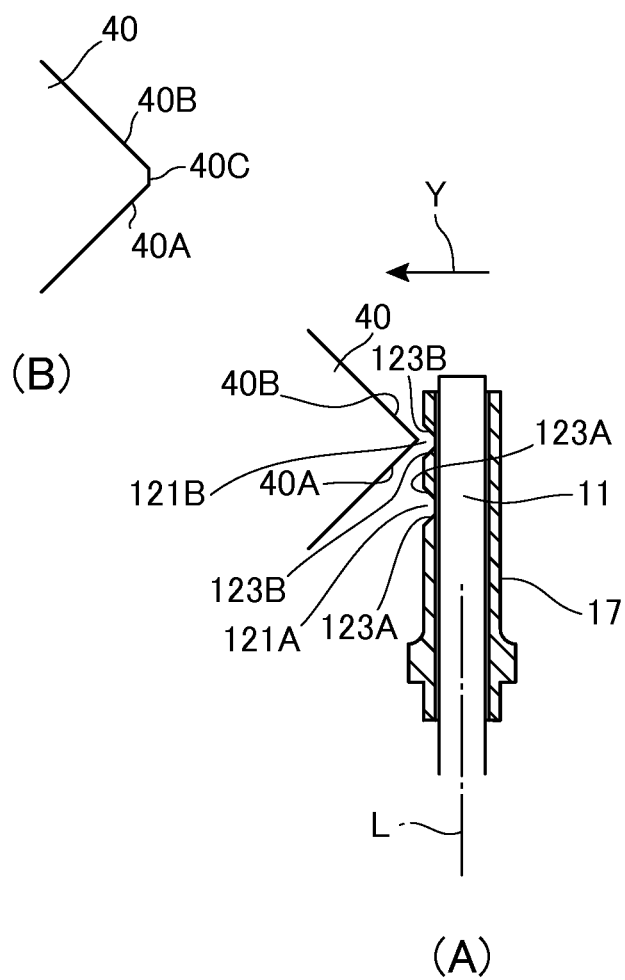
FIG. 7 A is a cross-sectional view showing the working tool, and B is a diagram showing a workpiece.

As shown in FIGS. 6A and B, the machining unit 200 has plural (two) working tools 11 and 21 which are different in type.

One working tool 11 is an end mill (cutting blade), and rotated at high speed by a motor 11A. As shown in FIG. 6A, the working tool 11 is fixed to a holder 12 integrally with the motor 11A. The holder 12 is connected to a rotating member 14 through a floating mechanism 13, and floated in the direction of an arrow X on the basis of the rotating member 14. The holder 12 is pushed in the rightward arrow direction by air pressure at all times. When the workpiece 40 is pressed against the working tool 11, the holder 12 is floated in the leftward arrow direction in accordance with the magnitude of cutting resistance, whereby the cutting resistance is adjusted.

Figure 2:
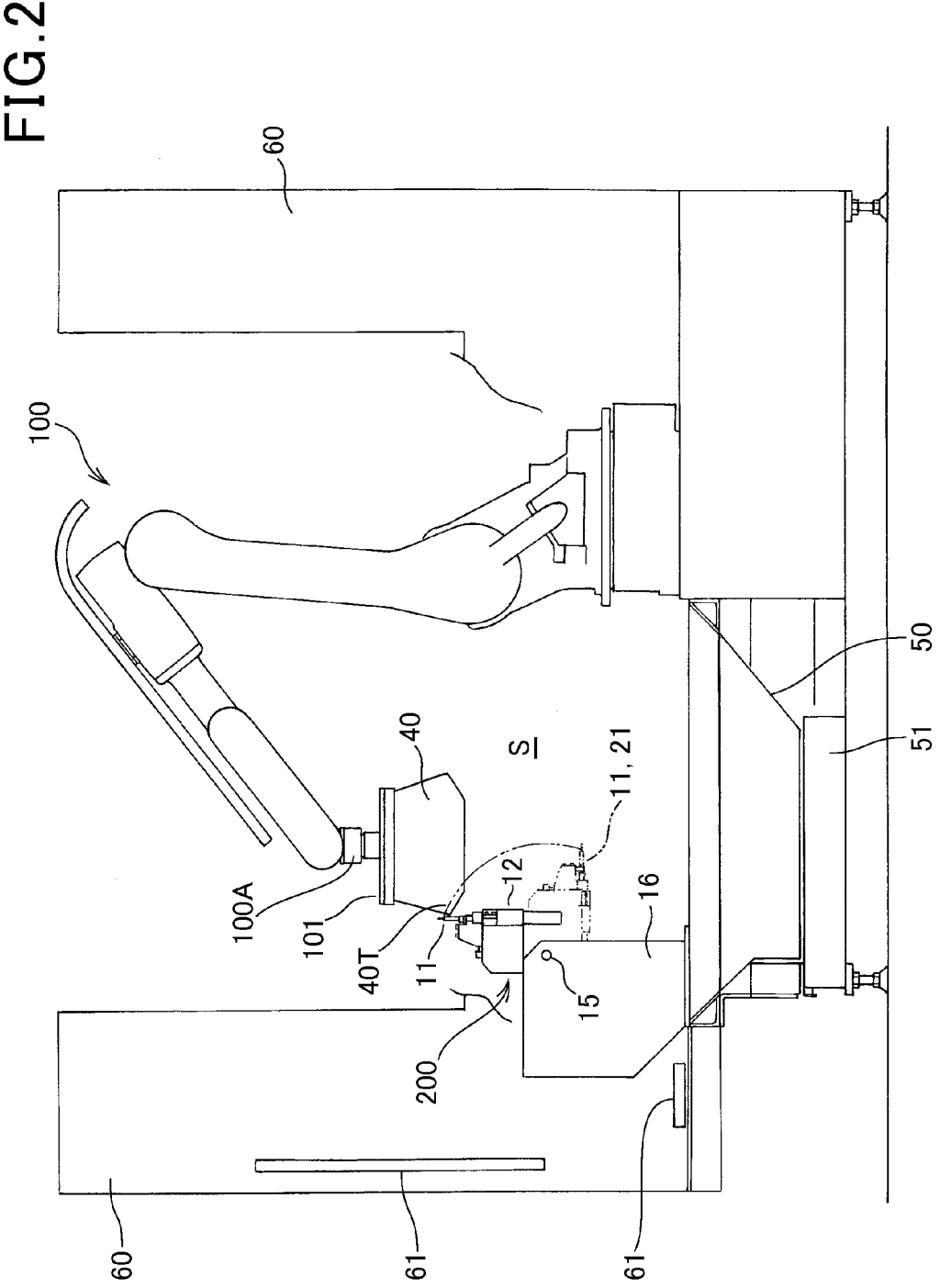
FIG. 2 is a side view showing the machining device.

As shown in FIG. 6B, the rotating member 14 is freely rotatably supported through a support shaft 15 between a pair of brackets 16 (see FIG. 2).

As shown in FIG. 6A, the rotating member 14 is designed in L-shape, and the tip 18B of a rod 18A of an air cylinder 18 is connected to the tip 14A of the rotating member 14. The base end 18C of the air cylinder 18 is supported by a bracket 16.

Accordingly, when the rod 18A of the air cylinder expands and contracts, the rotating member 14 rotates clockwise or counterclockwise around the support shaft 15.

The other working tool 21 is a cutter (cutting blade), and fixed to an ultrasonic vibrator 29. The ultrasonic vibrator 29 ultrasonically vibrates the working tool 21 in the axial direction thereof. The vibrator 29 is not limited to an ultrasonic vibrator.

The ultrasonic vibrator 29 is fixed to the holder 22. The holder 22 is connected to a rotating member 24 through a floating mechanism 23, and floated in the direction of an arrow Z (vertically to the paper surface in FIG. 6B) on the basis of the rotating member 24. The rotating member 24 is freely rotatably supported through a support shaft 15 by the same construction as the rotating member 14. The tip 28B of a rod 28A of an air cylinder 28 is connected to the rotating member 24. The base end 28C of the air cylinder 28 is supported by a bracket 16.

Accordingly, when the rod 28A of the air cylinder 28 expands and contracts, the rotating member 24 rotates clockwise or counterclockwise around the support shaft 15.

The workpiece 40 is pressed against these two working tools 11 and 21 under the state that one working tool is evacuated to an evacuation position and the other working tool is protruded to a machining position.

When the rod of the air cylinder 18 is made to expand, the rotating member 14 rotated counterclockwise around the support shaft 15 as shown in FIG. 6A, and the one working tool 11 protrudes to a vertical machining position. At this time, the rod of the air cylinder 28 is made to contract to evacuate the working tool 21 to a horizontal evacuation position. Under this state, the workpiece 40 is pressed against the working tool 11. When the processing of the working tool 11 is completed, the rod of the air cylinder 18 is made to contract, the working tool 11 is evacuated to a horizontal evacuation position, and the rod of the air cylinder 28 is made to expand. At this time, the rotating member 24 rotates counterclockwise around the support shaft 15, and the other working tool 21 protrudes to a vertical machining position. Under this state, the workpiece 40 is pressed against the working tool 21 and processed.

The machining order of the working tool 11 and the working tool 21 may be arbitrary, and the machining may be performed alternately and repeatedly.

FIGS. 7 to 14 show embodiments of the working tools.

For example, as shown in FIG. 7A, the working tool 11 is rotatable at high speed around the axial line L thereof by the motor 11A, and burrs can be cut by a blade (not shown) formed on the periphery of the end mill. A router bit, a T-shaped slot cutter or the like may be used as the working tool 11. A substantially cylindrical sleeve 17 is disposed on the outer periphery of the working tool 11 so that the working tool 11 is rotatable. As shown in FIG. 6B, the sleeve 17 is integrally held by a holding member 118, and the holding member 118 is connected to the holder 12 through a floating mechanism 119. Accordingly, the holding member 118 is freely reciprocable in the axial direction integrally with the sleeve 17.

As shown in FIG. 7A, two cut-out portions 121A and 121B are formed on the outer periphery of the sleeve 17 to be spaced from each other at an interval in the axial direction, a part of the cutting blade of the working tool 11 is exposed to the outside through the cut-out portions 121A and 121B.

The cut-out portions 121A and 121B are cut out to be substantially V-shaped in side view, and a pair of profiling portions 123A and 123B to be brought into contact with a pair of profiling surfaces 40A and 40B of the surface of the workpiece 40 are placed to the cut-out portions 121A and 121B. The cut-out portions 121A and 121B are different in size, and the cut-out portion 121A is formed to be larger than the cut-out portion 121B.

When the edge of the workpiece 40 is chamfered (de-burred), the rod 18A of the air cylinder 18 is made to expand as shown in FIG. 6A, whereby the rotating member 14 is rotated counterclockwise around the support shaft 15, and the one working tool 11 is erected to the machining position (see FIG. 2). Subsequently, the attitude of the workpiece 40 is controlled in the direction of an arrow Y as shown in FIG. 7A by driving the articulated robot 100 to press the workpiece 40 against the working tool 11.

A pair of profiling portions 123B placed to the smaller cut-out portion 121B is brought into contact with the profiling surfaces 40A and 40B of the surface of each workpiece 40, and the edge of the workpiece 40 is cut by the working tool 11, thereby forming a small chamfer 40C as shown in 7B.

When the working tool 11 is pressed against the workpiece 40, the pushing force for the working tool 11 is controlled by the floating mechanism 13. Therefore, cutting is excellent, and cutting is performed while the pair of profiling portions 123B is brought into contact with the profiling surfaces 40A and 40B, so that the cutting blade does not bite into the workpiece 40, a spot subjected to cut is finely finished without being corrugated and small chamfering 40C can be completed with high precision.

Figure 8:
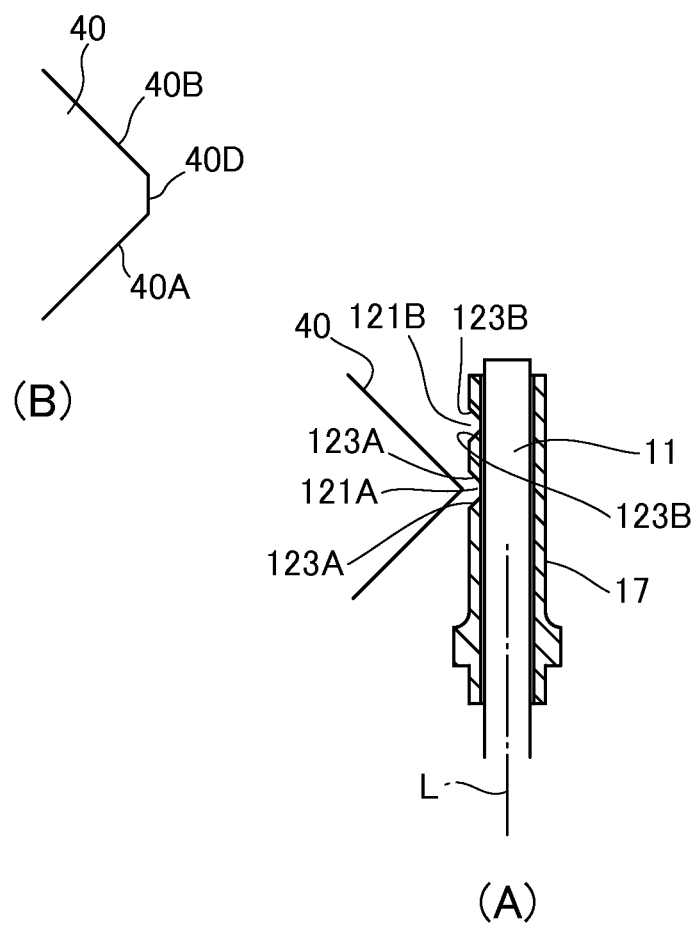
FIG. 8 A is a cross-sectional view showing the working tool, and B is a diagram showing the workpiece.

When large chamfering 40D is executed on the edge of the workpiece 40 as shown in FIG. 8, the edge of the workpiece 40 is guided to the larger cut-out portion 121A placed to the sleeve 17 under the control of the articulated robot 100. By the same procedure as described above, the pair of profiling portions 123A placed to the larger cut-out portion 121A is brought into contact with the profiling surfaces 40A and 40B of the surface of each workpiece 40, and the edge of the workpiece 40 is cut by the working tool 11, thereby forming a large chamfer 40D as shown in FIG. 8B. When the working tool 11 is pressed to the workpiece 40, the pushing force for the working tool 11 is controlled. Therefore, cutting is excellent, and cutting is performed while the pair of profiling portions 123A abuts against the profiling surfaces 40A and 40B. Therefore, the cutting blade does not bite into the workpiece 40, a spot subjected to cut is finely finished without being corrugated, and the large chamfering 40D can be completed with high precision.

In this embodiment, the two cut-out portions 121A and 121B different in size are formed on the outer periphery of the sleeve 17 to be spaced from each other in the axial direction, and a part of the cutting blade of the working tool 11 is exposed to the outside through the cut-out portions 121A and 121B. Therefore, the small chamfering 40C and the large chamfering 40D can be executed through a series of cutting steps by performing only the position and attitude control of the working tool 11 with the articulated robot 100 and without performing change-over such as the change of the sleeve for example.

Figure 9:
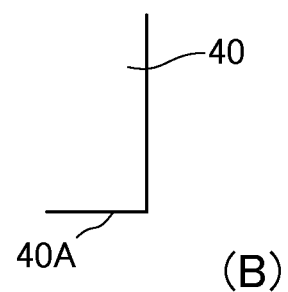
FIG. 9 A is a cross-sectional view showing the working tool, and B is a diagram showing the workpiece.
Figure 9:
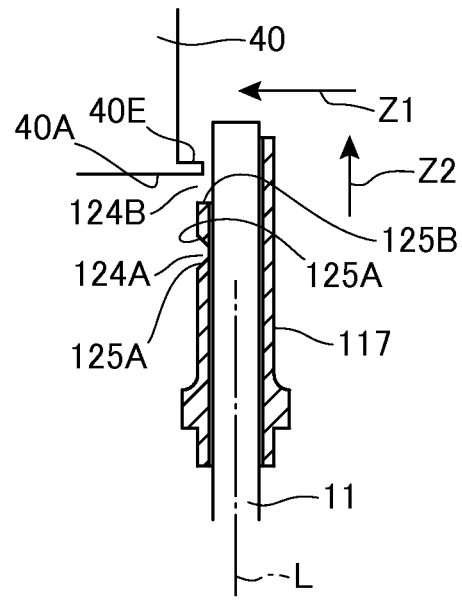

For example, in FIG. 9, the working tool 11 is configured to be rotatable around the axial line L thereof, and the substantially cylindrical sleeve 117 is placed on the outer periphery of the working tool 11.

The two cut-out portions 124A and 124B are formed on the outer periphery of the sleeve 117 to be spaced from each other in the axial direction, and a part of the cutting blade of the working tool 11 is exposed through the cut-out portions 124A and 124B. The cut-out portion 124A is cut out to be substantially V-shaped in side view, and a pair of profiling portions 125A to be brought which into contact with a pair of profiling surfaces 40A and 40B of the surface of the workpiece 40 are placed at the cut-out portion 124A.

The cut-out portion 124B is cut out toward the tip of the sleeve, and placed with a profiling portion 125B at a reference end thereof.

When the burr 40E is removed in FIG. 9A, the working tool 11 is pressed against the workpiece 40 in the direction of an arrow Z1 under the control of the articulated robot 100, whereby a part of the edge of the workpiece 40 is cut at the root thereof.

Subsequently, the working tool 11 is pressed against the workpiece 40 in the direction of an arrow Z2. When the profiling portion 125B placed to the sleeve 117 touches the profiling face 40A of the surface of the workpiece 40, the working tool 11 is fed in the perpendicular direction to the plane of the paper so that the profiling portion 125B profiles the profiling face 40A of the surface of the workpiece 40, whereby the burr 40E can be deburred so that the spot subjected to cut is finely finished without being corrugated as shown in FIG. 9B.

Figure 10:
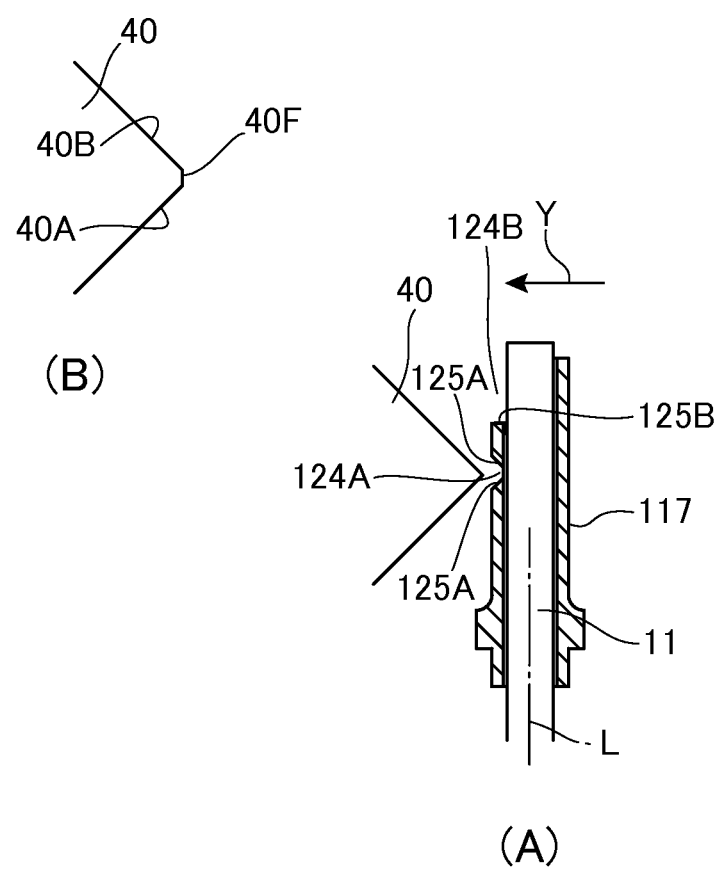
FIG. 10 A is a cross-sectional view showing the working tool, and B represents a diagram showing the workpiece.

When chamfering 40F is executed on the edge of the workpiece 40 as shown in FIG. 10, the attitude of the working tool 11 is controlled to be tilted to the edge of the workpiece 40 under the control of the articulated robot 100, and under this state the working tool 11 is pushed in the direction of the arrow Y to the workpiece 40.

At this time, a pair of profiling portions 125A placed to the cut-out portion 124A is brought into contact with the profiling faces 40A and 40B of the surface of each workpiece 40, and the edge of the workpiece 40 is cut by the working tool 11, whereby a chamfer 40F is formed as shown in FIG. 10B.

When the working tool 11 is pressed against the workpiece 40, the pushing force thereof is controlled by the floating mechanism 13. Therefore, cutting is excellent, and the pair of profiling portions 125A is brought into contact with the profiling faces 40A and 40B, so that the cutting blade does not bite into the workpiece 40 and the chamfering 40F can be performed with high precision.

In this embodiment, the two cut-out portions 124A, 124B which are different in size are formed on the outer periphery of the sleeve 117 to be spaced from each other in the axial direction, and a part of the cutting blade of the working tool 11 is exposed to the outside through the cut-out portions 124A and 124B. Therefore, different types of chamfering 40E and 40F can be executed through a series of cutting steps by performing only the position and attitude control of the working tool 11 with the articulated robot 100 without performing the change-over such as the change of the sleeve for example.

Figure 11:
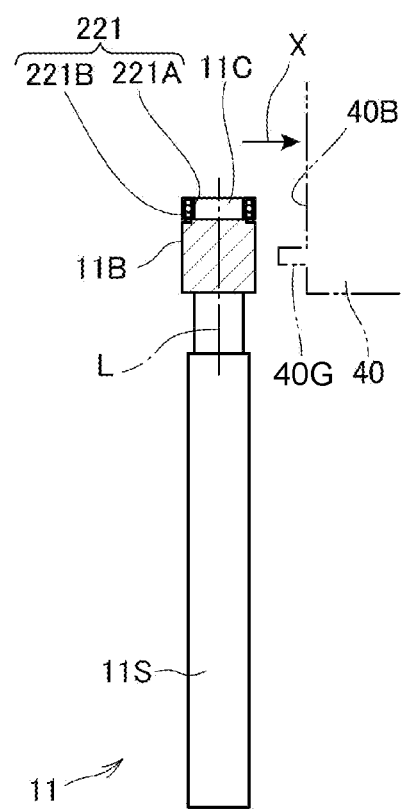
FIG. 11 is a side view showing the working tool.

As shown in FIG. 11, the working tool 11 has a shank 11S, a blade portion (tool main body) 11B formed integrally with the tip portion of the shank 11S, and a small-diameter portion 11C formed at the tip portion of the blade portion 11B. The working tool 11 is configured to be rotatable around the axial line L thereof. The working tool 11 is an end mill, and it is rotatable at high speed by a motor 11A, and can cut burrs by the blade portion 11B. A router bit, a T-shaped slot cutter or the like may be used as the working tool 11. A rolling bearing 221 is attached to the small-diameter portion (tool main body) 11C of the working tool 11. The rolling bearing 221 has an inner ring 221A and an outer ring 221B, and the inner ring 221A is fitted to the small-diameter portion 11C, whereby the rolling bearing 221 is attached to the small-diameter portion 11C.

When the attitude of the working tool 11 is controlled in the direction of the arrow X so as to approach to the burr 40G of the workpiece 40 as shown in FIG. 11 under the control of the articulated robot 100, cutting of the burr 40g by the blade portion 11B of the working tool 11 starts.

When the working tool 11 is moved until the outer ring 221B of the rolling bearing 221 comes into contact with the profiling face 40B of the workpiece 40, the working tool 11 is moved in the direction perpendicular to the paper surface of FIG. 11 under the control of the articulated robot 100.

In this moving process, the outer ring 221B rolls on the profiling face 40B of the workpiece 40, and the burr 40G is smoothly cut by the blade portion 11B of the working tool 11.

In this embodiment, when the working tool 11 is pressed against the workpiece 40, the pushing force therefor is controlled by the floating mechanism 13, and thus cutting is excellent. Furthermore, since the outer ring 221B rolls on the profiling face 40B of the workpiece 40 during cutting, no trace of the outer ring 221B remains on the profiling face 40B, the blade portion 11B does not bite into the workpiece 40, a part which has been subjected to cut is finely finished without being corrugated, and the burr 40G can be removed with high precision.

Figure 12:
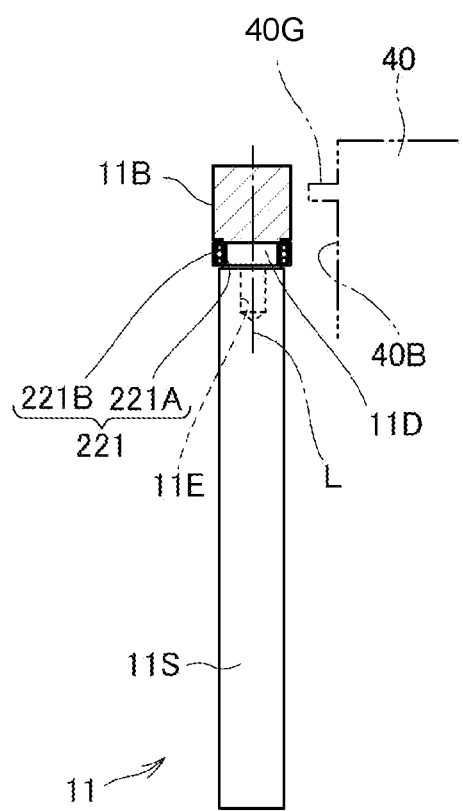
FIG. 12 is a side view showing the working tool.

For example, as shown in FIG. 12, the working tool 11 has a shank 11S, and a blade portion (tool main body) 11B. A small-diameter portion 11D is formed at the tip portion of the shank 11S (at the connection portion side to the shank of the tool main body). A rolling bearing 221 is attached to the small-diameter portion 11D. The rolling bearing 221 has an inner ring 221A and an outer ring 221B, and the inner ring 221A is fitted to the small-diameter portion 11D. The blade portion 11B of the working tool 11 has a screw portion 11E which penetrates through the small-diameter portion 11D and reaches the shank 11S, and the blade portion 11B of the working tool 11 is connected to the shank 11S through the screw portion 11E. The connecting manner is not limited to the connection based on the screw portion 11E, and for example, shrinkage-fit, press-fit or the like may be used. The working tool 11 is configured to be rotatable around the axial line L thereof.

The working tool 11 is an end mill and rotatable at high speed by the motor 11A, and it can cut burrs by the blade portion 11B. A router bit, a T-shaped slot cutter or the like may be used as the working tool 11. When this embodiment is compared with the embodiment shown in FIG. 11, the fixing position of the rolling bearing 221 is different therebetween. Accordingly, the working tool 11 of this embodiment may be used in place of the embodiment of FIG. 11 in accordance with the position of burrs formed on the workpiece 40.

In this embodiment, the outer ring 221B rolls on the profiling face 40B of the workpiece 40, and the cutting of the burr 40G by the blade portion 11B of the working tool 11 is smoothly performed. Furthermore, when the working tool 11 is pressed against the workpiece 40 so that the outer ring 221B touches the profiling face 40B, the pushing force for the working tool 11 is controlled by the floating mechanism 13. Therefore, cutting is excellent. Furthermore, cutting is performed while the outer ring 221B rolls on the profiling face 40B of the workpiece 40, so that the blade portion 11B does not bite into the workpiece 40 and thus the burr 40G can be removed finely with high precision.

Figure 13:
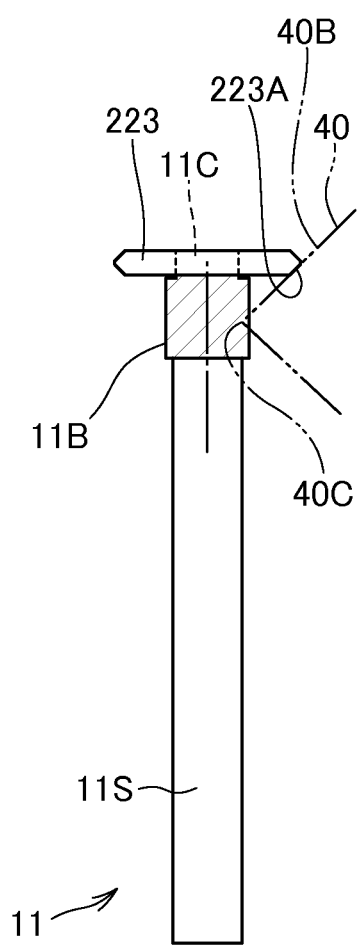
FIG. 13 is a side view showing the working tool.

For example, as shown in FIG. 13, the working tool 1 has a shank 11S, and a blade portion (tool main body) 11B formed integrally with the tip portion of the shank 11S, and is configured to be rotatable around the axial line L thereof. The working tool 11 is an end mill and rotatable at high speed by the motor 11A, and it can cut burrs by the blade portion 11B. A small-diameter portion 11C is formed at the tip of the blade portion 11B. A disc-shaped profiling member 223 is connected to the small-diameter portion 11C by shrinkage-fit, press-fit or the like, and a tapered profiling face 223A is formed on the outer peripheral portion of the profiling member 223.

In this embodiment, the profiling face 223A of the profiling member 223 is brought into contact with the profiling face 40B of the workpiece 40, and thus a chamfer target 40C can be smoothly removed by the blade portion 11B. Furthermore, when the working tool 11 is pressed against the workpiece 40, the pushing force for the working tool 11 is controlled by the floating mechanism 13, and thus cutting is excellent. Furthermore, cutting is performed while the profiling face 223A of the profiling member 223 is brought into contact with the profiling face 40B of the workpiece 40, so that the blade portion 11B does bite into the workpiece 40 and chamfering 40C can be finely performed with high precision.

Figure 14:
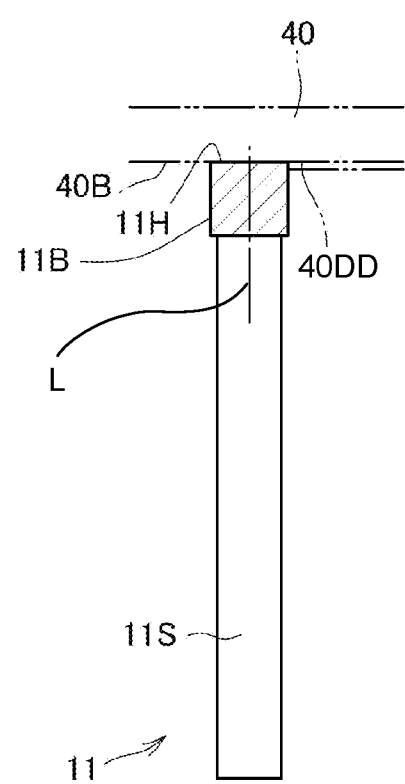
FIG. 14 is a side view showing the working tool.

For example, as shown in FIG. 14, the working tool 11 has a shank 11S and a blade portion (tool main body) 11B formed integrally with the tip portion of the shank 11S, and it is configured to be rotatable around the axial line L thereof. The working tool 11 is an end mill and rotatable at high speed, and can cut burrs by the blade portion 11B. A profiling face 11H is formed at the lower end of the blade portion 11B.

In this embodiment, the profiling face 11H is brought into contact with the profiling face 40B of the workpiece 40 in the process of removing burrs, so that burr 40DD can be smoothly removed by the blade portion 11B. When the working tool 11 is pressed against the workpiece 40, the pushing force for the working tool 11 is controlled by the floating mechanism 13, and thus cutting is excellent. Since cutting is performed while the profiling face 11H touches the profiling face 40B, the burr 40DD can be finely removed with high precision.

Figure 15:
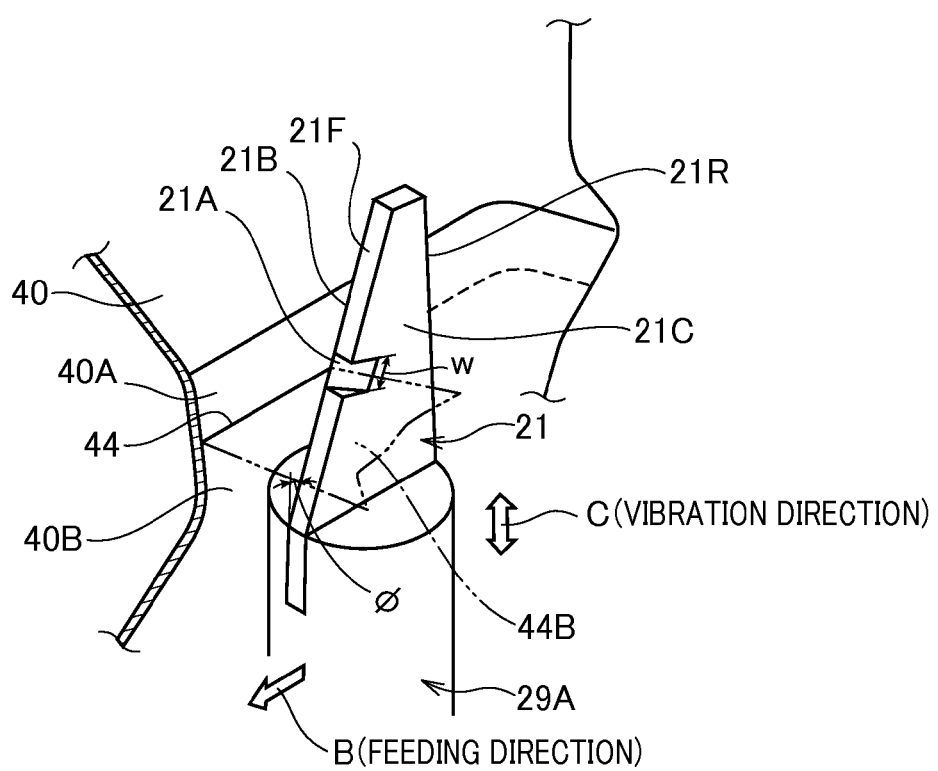
FIG. 15 is a perspective view showing the working tool.

FIG. 15 shows an embodiment of the other working tool 21.

The working tool 21 is a cutter blade, and fixed to the tip of a support horn 29A of an ultrasonic vibrator 29. The cutter blade 21 is vibrated by ultrasonic in a direction (the direction of an arrow C) substantially perpendicular to the feeding direction (the direction of an arrow B) of the cutter blade 21 in accordance with vibration of the ultrasonic vibrator 29. The ultrasonic vibrator 29 is connected to and driven by an ultrasonic unit (not shown).

The cutter blade 21 has a front end face 21F and a rear end face 21R, and comes into contact with the base portion (root) of burr 44B formed on, for example, a parting line 44 of the workpiece 40 (for example, business equipment, outdoor parts, car interior and exterior parts, plastic parts of home appliances or the like).

In this case, the sweepback angle $\Phi$ of the front end face 21F is arbitrarily set, and it is set to approximately 10°. The cutter blade 21 has a cutting blade portion 21A of, for example, approximately several millimeters in width which corresponds to the root of the burr 44B, and a profiling portion 21B having a curved surface which corresponds to the respective face portions 40A and 40B of the workpiece 40 and does not constitute a cutting blade. The cutting blade portion 21A and the profiling portion 21B are placed at the front end face 21F side of the cutter blade main body portion 21C.

In this case, the width w of the cutting blade portion 21A is generally set approximately in the range from 0.6 mm to 1 mm. However, it may be suitably changed in accordance with the shape or the like of burrs formed on the workpiece 40.

In this embodiment, the articulated robot 100 catches the workpiece 40, and the machining unit 20 is placed at a fixed portion located within a zone which the arm of the articulated robot 100 can reach. Therefore, the machining point of the workpiece 40 does not greatly move, and cutting chips fall down at the same machining position, so that the cutting chips do not scatter.

Furthermore, since the machining point does not move, movement of a worker may be a little under the teaching operation (teaching). Since the machining unit 200 is located at the fixed position, there is no risk that a power cable, a signal cable or the like of the working tools 11 and 21 coils around the robot arm, the machining operation of the articulated robot 100 is not restricted, cable maintenance is unnecessary, it is unnecessary to use an expensive flex-resistance cable, and thus an inexpensive cable may be used.

In this embodiment, the catch instrument 101 having high rigidity for catching the workpiece 40 is equipped to the arm tip 100A of the articulated robot 100. Therefore, when the workpiece 40 is moved to the machining position and when the workpiece 40 is processed by the machining unit 200, chattering vibration, etc. occurring in the workpiece 40 can be restrained, and the workpiece 40 can be processed with high precision by the machining unit 200.

In the case of plastic molding, route information obtained by direct teaching or a route automatic generating system does not always provide a right route because the workpiece 40 as an actual machining target fluctuates in size.

Particularly, in this embodiment, the workpiece 40 which is taken out from the molds 2, 3 in the molding machine 41 is in very high temperature as described above, and the machining unit 200 executes the processing on the workpiece 40 without cooling the workpiece 40 under the state that the workpiece 40 keeps high temperature. Therefore, the workpiece 40 thermally shrinks. There is material which thermally shrinks by about 20 mm for a workpiece of 700 mm in size, for example. Accordingly, a right route is not obtained for each workpiece 40 due to this thermal shrinkage.

In this embodiment, the articulated robot 100 catches the workpiece 40, and the workpiece 40 is directly pressed against the machining unit 200 under the state that the workpiece 40 keeps high temperature. The working tools 11 and 21 are supported through the respective floating mechanism 13, 23 at the fixed portion. Therefore, not only the shrinkage of the outer shape of the workpiece 40 due to thermal shrinkage just after plastic molding, but also "deviation" caused by dispersion of products can be absorbed, and a series of machining steps of the workpiece 40 can be accurately and smoothly performed.

Furthermore, even when the attitude of the articulated robot 100 varies and thus the attitude of the workpiece 40 to the working tool 11 and 21 varies, the cutting blades of the working tool 11 and 21 do not bite into the workpiece 40 because the working tool 11 and 21 has the profiling portion corresponding to the profiling face of the workpiece 40.

Accordingly, in the case of the workpiece 40 which is still kept under high-temperature state just after it is taken out from the molds 2 and 3 in the molding machine 41, the processing work can be performed with high precision, and a series of works to process the resin workpiece 40 taken out from the molds 2 and 3 can be easily, accurately and sequentially performed in short time.

Design of molds 2 and 3 has been hitherto performed so that the sizes of these molds are determined in consideration of shrinkage allowance of plastic products under the processing. In view of this consideration, a teaching operation may be performed in consideration of shrinkage of resin products when teaching is performed on the articulated robot 100. When the shrinkage or deformation of the workpiece 40 is larger than the tolerance of the floating mechanism 13 or the like, the shrinkage or deformation of the workpiece 40 may be detected by a sensor, a camera or the like (not shown) to position the workpiece 40 within the tolerance of the floating mechanism, whereby the profiling processing can be accurately and smoothly performed without biting into the workpiece 40.

In this embodiment, the workpiece 40 is taken out from the molds 2 and 3 by using the catch instrument 101 of the articulated robot 100.

At this time, the molds 2 and 3 are generally configured with an ejector pin (not shown), and the workpiece 40 is pushed out from the mold 3 in the opening direction of the mold 2, and the pushed workpiece 40 is sucked by the catch instrument 101 and taken out.

In order to smoothly perform this sucking operation, a cushion mechanism (not shown) comprising an air cylinder or the like may be equipped at the connection portion between the arm tip 100A and the catch instrument 101. When the workpiece 40 is taken out, the catch instrument 101 is brought into close contact with the workpiece 40, and the workpiece 40 is pushed out from the mold 3 by the ejector pin. At this time, the catch instrument 101 follows the operation of the cushion mechanism and evacuates in the push-out direction of the ejector pin, whereby the workpiece 40 is smoothly sucked. In the secondary processing of the workpiece 40, for example, air pressure may be supplied to the air cylinder in response to a control signal of the articulated robot 100 to lock the air cylinder, thereby making the cushion mechanism non-operable.

DESCRIPTION OF REFERENCE NUMERALS 2, 3 mold
11, 21 working tool
13 floating mechanism
40 workpiece
41 plastic molding machine
100 articulated robot
200 machining unit

The invention claimed is:

1. A machining apparatus comprising:
an articulated robot that has a catch instrument at an arm tip thereof, which catch instrument is for catching a workpiece, the robot taking out the workpiece after molding from molds of a plastic molding machine; and
a machining unit equipped at a bracket that is located within an arm reachable zone of the articulated robot when machining the workpiece, wherein
the machining unit has a plurality of working tools, wherein each of the working tools is rotatably supported, via a common support shaft on the bracket, for rotation of each of the working tools about a common pivot axis between a machining position of the respective working tool, where the respective working tool machines the workpiece, and an evacuated position of the respective working tool, where the respective working tool does not machine the workpiece, wherein each of the working tools is independently rotatable with respect to each other about the pivot axis between the respective machining position and the respective evacuated position, each of the working tools being pressed to a machining target portion of the workpiece caught by the catch instrument of the articulated robot according to attitude control of the articulated robot to conduct a machining on the workpiece, and the machining unit is configured so as when one of the working tools is moved from the evacuated position of the one working tool to the machining position of the one working tool, another of the working tools is evacuated from the machining position of the another working tool to the evacuated position of the another working tool, and
the machining apparatus further comprising a profiling portion that is pressed to a profiling surface of the workpiece to control an amount of the machining on the workpiece, which profiling portion is provided to one of the working tools.

2. The machining apparatus according to claim 1, wherein the catch instrument has a position deviation preventing mechanism thereon that prevents relative position deviation of the workpiece relative to the catch instrument that is caused by cutting resistance between the catch instrument and the workpiece when the workpiece is processed.

3. The machining apparatus according to claim 2, wherein the catch instrument is a workpiece suction type instrument, and the position deviation preventing mechanism is configured to have a concave portion or a convex portion that fits on a surface of the catch instrument and that is designed along the shape of the workpiece.

4. The machining apparatus according to claim 2, wherein the catch instrument is a workpiece pinching instrument, and the position deviation preventing mechanism is configured to include a balance cylinder to drive jaws that pinch the workpiece.

5. The machining apparatus according to claim 1, wherein one of the working tools includes a body, wherein a blade is provided at an outer perimeter of the body, the machining apparatus further comprising a sleeve which is in substantially cylindrical shape and within which the body is rotatable, wherein the sleeve is disposed at an outer perimeter of the body, wherein the sleeve is provided with a cutout portion through which a part of the blade is exposed, and wherein the profiling portion that is contacted with the profiling surface of the workpiece is provided at the cutout portion.

6. The machining apparatus according to claim 1, wherein one of the working tools has a shank, a blade portion formed at a tip portion of the shank, and a smaller-diameter portion formed at a tip portion of the blade portion, and wherein a rolling bearing that constitutes the profiling portion is attached to the smaller-diameter portion.

7. The machining apparatus according to claim 1, wherein one of the working tools has a shank, a smaller-diameter portion formed at a tip portion of the shank, and a blade portion formed at a tip portion of the smaller-diameter portion, and wherein a rolling bearing that constitutes the profiling portion is attached to the smaller-diameter portion.

8. The machining apparatus according to claim 1, wherein one of the working tools has a shank, a blade portion formed at a tip portion of the shank, and a smaller-diameter portion formed at a tip portion of the blade portion, wherein a profiling member in circular shape is connected to the smaller-diameter portion, and wherein a profiling surface that constitute the profiling portion is formed at an outer periphery of the profiling member.

9. The machining apparatus according to claim 1, wherein one of the working tools has a shank, and a blade portion formed at a tip portion of the shank, and the profiling portion is formed at the tip portion of the blade portion.

10. The machining apparatus according to claim 1, wherein the machining unit comprises a floating mechanism to which one of the working tools is provided and which floating mechanism controls a pushing force of the profiling portion against the profiling surface of the workpiece.

\* \* \* \* \*